United States Patent
Mueller et al.

(10) Patent No.: US 11,841,788 B2
(45) Date of Patent: Dec. 12, 2023

(54) SELF-OPTIMIZING ANALYSIS SYSTEM FOR CORE DUMPS

(71) Applicant: International Business Machines Corporation, Armonk, NY (US)

(72) Inventors: Raphael Mueller, Jettingen (DE); Michael Reichert, Hildrizhausen (DE)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 17/344,242

(22) Filed: Jun. 10, 2021

(65) Prior Publication Data

US 2022/0398185 A1  Dec. 15, 2022

(51) Int. Cl.
| | | |
|---|---|---|
| G06F 11/00 | (2006.01) | |
| G06F 11/36 | (2006.01) | |
| G06F 11/07 | (2006.01) | |

(52) U.S. Cl.
CPC .......... *G06F 11/366* (2013.01); *G06F 11/079* (2013.01); *G06F 11/0778* (2013.01)

(58) Field of Classification Search
None
See application file for complete search history.

(56) References Cited

U.S. PATENT DOCUMENTS

| 9,135,443 | B2* | 9/2015 | Ramchetty | G06F 21/564 |
|---|---|---|---|---|
| 2005/0210335 | A1 | 9/2005 | Muratori | |
| 2015/0100834 | A1 | 4/2015 | Chamberlain | |
| 2015/0317477 | A1 | 11/2015 | Piper | |
| 2016/0292030 | A1 | 10/2016 | Akirav | |
| 2017/0116105 | A1 | 4/2017 | Chamberlain | |
| 2017/0371734 | A1 | 12/2017 | Gadi | |
| 2017/0371766 | A1* | 12/2017 | Gadi | G06F 11/366 |

(Continued)

FOREIGN PATENT DOCUMENTS

| CN | 106598871 A | 4/2017 |
|---|---|---|
| CN | 106354646 B | 12/2018 |
| WO | 2020264515 A1 | 12/2020 |

OTHER PUBLICATIONS

Google Scholar/Patents search—text refined (Year: 2022).*

(Continued)

*Primary Examiner* — Christopher S McCarthy
(74) *Attorney, Agent, or Firm* — Donald G. Weiss; Haley J. McClory (57) ABSTRACT

A method for facilitating root cause analysis of a software crash by core dump analysis is disclosed. The method comprises receiving a core dump file relating to a software program, identifying unique source code lines in the core dump file for each running thread at the crash time, and determining unique source code lines as conspicuous source code lines depending on an abstraction level value indicating a number of occurrences of the conspicuous source code line in different threads. Furthermore, the method comprises determining an abstraction ratio as a function of a number of conspicuous source code lines and a number of unique source code lines, evaluating whether the predefined abstraction level value has to be adjusted by determining unique source code line as a conspicuous source code line and determining an abstraction ratio, and outputting the conspicuous source code lines and an assessment value for the abstraction ratio.

20 Claims, 6 Drawing Sheets

(56) References Cited

U.S. PATENT DOCUMENTS

2018/0024876 A1    1/2018    Addison
2021/0286702 A1*  9/2021    Grover ................ G06F 11/3636

OTHER PUBLICATIONS

Google Scholar/Patents search—text refined (Year: 2023).*
"DamZiobro/Gdb-Automatic-Deadlock-Detector", Downloaded from Internet Feb. 15, 2021, pp. 1-4, <https://github.com/DamZiobro/gdb-automatic-deadlock-detector>.
Neville-Neil., "Code Spelunking Redux", ACM Queue, Jan. 8, 2009, vol. 6 Issue 7, pp. 1-11, <https://queue.acm.org/detail.cfm?id=1483108>.
Neville-Neil., "Code Spelunking: Exploring Cavernous Code Bases", ACM Queue, Oct. 1, 2003, vol. 1, Issue 6, pp. 1-13, <https://queue.acm.org/detail.cfm?id=945136>.
Wikibooks, "Linux Applications Debugging Techniques/Deadlocks" Downloaded from Internet Feb. 15, 2021, pp. 1-3, <https://en.wikibooks.org/wiki/Linus_Applications_Debugging_Techniques/Deadlocks>.
International Search Report and Written Opinion, dated Jun. 8, 2022, Application No. PCT /IB2022/055316, 9 pages.

* cited by examiner

SELF-OPTIMIZING ANALYSIS SYSTEM FOR CORE DUMPS

BACKGROUND

The invention relates generally to a method for facilitating root cause analysis, and more specifically, to a computer-implemented method for facilitating root cause analysis of a software crash by core dump analysis. The invention relates further to a core dump analysis system for facilitating root cause analysis of a software crash by core dump analysis, and a computer program product.

The speed of software development has become a critical success factor for enterprises as well as software and consulting companies. However, the source code base of today's enterprise software products tends to be huge and complex. This is only partially driven by event-based programming approaches and containerization. This creates challenges in maintaining this software for all types of developers, regardless of seniority. But not only during the maintenance phase but also during development it has become essential to debug faulty program code quickly and elegantly.

Several tools exist to address this volume issue and some of them are discussed under the topic "Code Spelunking: Exploring Cavernous Code Bases" (compare, e.g., https://queue.acm.\org/detail.cfm?id=945136) or the topic "Code Spelunking Redux (compare https://queue.acm.\org/detail.cfm?id=1483108).

Apart from the sheer amount of source code, the nature of the enterprise software itself adds another dimension of complexity. Enterprise software may allow a user to execute the same kind of tasks concurrently with a high rate with each task potentially competing on the same kind of resources. So, today's enterprise software works/acts in a multi-tasking and multi-threading manner For example, a relational database management system (RDBMS) may use multiple parallel streams to cope with a high volume of concurrent transactions potentially accessing the same data.

In case of an error that is not properly handled, the software itself writes out—it dumps with the help of system resources—diagnostic information of each active execution unit, i.e., all processes and their associated threads. Examples for this type of error are deadlocks, infinite loops, access to protected memory, or memory that does not exist anymore, etc. The diagnostic data may represent a snapshot of the process state at the time of the failure. This can include register values, allocated memory, state and call stack for each thread, and so on.

In the context of Unix-like operating systems, these snapshots are called core dumps or core dump files. Although enterprise software traces statuses and diagnostic information to an available tracing facility at runtime, software developers often need to analyze the diagnostic data of all contributing processes and/or the core dumps of all involved processes, for the following reasons: (i) There are no suitable traces available for the current issue, i.e., because of insufficient trace (tracing) information in the source code; (ii) the currently active tracing level is too low and thus, important information is missing in the trace files, or (iii) due to the system's workload at the time of the issue, the tracing information of interest have been overwritten already because of round robin usage of trace files with more current trace information.

Thereby, core dumps are not human-readable per se; thus, a software developer may need to have the skills to pre-process them. But even if this skill is not missing, analyzing core dumps is not a trivial task for the following reasons: (i) one does not know which core dumps are relevant to find the root cause of a problem, or (ii) one does not know what to look for in a formatted core dump to find the root cause and fix the problem.

One failure class that is always hard to analyze are hanging situations such as deadlocks and infinite loops.

There are already publications that address similar problems, like the document CN 10635646 A. It discloses a method for analyzing dump files which—in a first step—comprises obtaining the generated dump files and other related collapse information files when software collapses, sending the dump files and the related collapse information files to a storage and, classifying, compressing and storing the collapse information files through the storage end according to a software module, and automatically opening and logging into a dump downloaded webpage. The disclosed method also discloses reminding people to check an analysis result log in time when an analysis result is obtained and marking the checked analysis log for distinguishing so that repeated checking can be avoided.

Additionally, the article "Code Spelunking Redux" by George V. Neville-Neil published in acmqueue and the related online version under https://queue.acm.org/detail.cfm? is=148-3108 published on Feb. 15, 2021 discloses the ever-growing complexity of programming computer systems and that it works basically against the code spelunker. It describes that computers are becoming more powerful and that the complexity of programming increases in many directions, including lines of code, number of modules, and numbers of systems and sub-systems. Different options of finding errors in source code are described including graphic representation of depending software modules.

However, one of the disadvantages of existing root cause analysis systems and methods is that they are pretty much reliant on specific hardware architectures. Furthermore, one failure class that is always hard to analyze are so-called "hanging situations", like deadlocks and infinitive loops.

Hence, there may be a need to overcome the problem with "hanging situations" and/or software crashes and propose a solution for an easier and more targeted root cause analysis after the software crash.

SUMMARY OF THE INVENTION

According to one aspect of the present invention, a computer-implemented method for facilitating root cause analysis of a software crash by core dump analysis may be provided. The method may comprise receiving at least one core dump file relating to a software program being executable as a plurality of threads, identifying unique source code lines in the at least one core dump file for each running thread at the time of the software crash, and determining each of the unique source code lines as a conspicuous source code line depending on a predefined abstraction level value. The abstraction level value may be indicative of a number of occurrences of the conspicuous source code line in different threads.

The method may further comprise determining an abstraction ratio as a function of a number of conspicuous source code lines and a number of unique source code lines, evaluating whether the predefined abstraction level value has to be adjusted for a further iteration of the steps determining unique source code lines as a conspicuous source code lines, determining an abstraction ratio, and outputting the conspicuous source code lines and an assessment value for the value of the abstraction ratio.

According to another aspect of the present invention, a core dump analysis system for facilitating root cause analysis of a software crash by core dump analysis may be provided. The system comprises a memory communicatively coupled to a processor, the memory storing program code portion which, when executed by the processor enable the processor to receive at least one core dump file relating to a software program being executable as a plurality of threads, identify unique source code lines in the at least one core dump file for each running thread at the time of the software crash, and determine each of the unique source code lines as a conspicuous source code line depending on a predefined abstraction level value. The abstraction level value may be indicative of a number of occurrences of the conspicuous source code line in different threads.

The program code portions may enable the processor also to determine an abstraction ratio as a function of a number of conspicuous source code lines and a number of unique source code lines, evaluate whether the predefined abstraction level value has to be adjusted for a further iteration of the steps determining unique source code lines as conspicuous source code lines and determining an abstraction ratio, and output the conspicuous source code line and an assessment value for the value of the abstraction ratio.

The proposed computer-implemented method for facilitating root cause analysis of a software crash by core dump analysis may offer multiple advantages, technical effects, contributions and/or improvements:

A direct advantage for analyzers/programmers looking for a root cause for a system crash—in particular an application software program crash—is the amount of data—he may have to walk through and analyze—which may be reduced significantly. By identifying conspicuous source code lines with a comparably high probability, the analyzer/developer may save a lot of valuable time and effort in order to perform his task, i.e., "finding the bug" that lets the system crash.

Based on this very much reduced amount of data and the highlighting of the conspicuous source code lines that may appear—depending on the abstraction level—in more than one of the threads being executed potentially in parallel, the analyzer/developer may receive exactly those source code lines that—with a high probability—may be responsible for the bad or non-functioning of the enterprise software program.

Furthermore—and in contrast to available solutions—the concept proposed here is independent of underlying hardware and software architectures. Thus, there is no read out of specific CPU registers or memory registers or data storage cells from which only with a high effort a link to the source code of the enterprise software program may be established. The inventive concept may rely on the assumption that those unique source code lines that are present in threads being executed in parallel at the time of the software crash may have a high probability to be involved in the software crash. Depending on the abstraction level, the method and the related system take into account source code lines that appear in e.g., only one, two or three—or even more—parallel executed threads. In this fact—i.e., a correlation between multiple threads—one of the advantageous technical effects may be seen. Due to the proliferation of multi-threaded enterprise (and other) application and hardware systems supporting multi-threaded execution through multi-kernel architectures effective analysis tools are required to identify not only dead-lock situation but also all other kind of unwanted software behavior (e.g., a sudden crash, infinite loops, access to protected memory, or memory that does not exist anymore) during execution. The ability of the concept proposed here to look over threads running in parallel may make it particularly valuable to analyzers/programmers.

Together with the parallel usage of historic data of earlier performed source code analysis, a determination of a range recommendation—in particular, an adjustment of a lower threshold range value for a percentage of the abstraction ratio—may be performed. In one of the embodiments, it may be assumed that the upper abstraction ratio threshold value may be fixed to a predefined value, e.g., 90%. This self-optimization of the proposed concept may render it all the more valuable, the more core dump analyses have been performed. Thereby, it doesn't matter, whether the finalizing root cause analysis was successful or not, i.e., RCH=1 or RCH=0 (see below).

Another advantage in the judgement of the specialist may be the closeness of the automatic root cause analysis to the view of developers. The generated output may also suggest areas in the program code that may have to be fixed. Therefore, the output is not registers, flags states and processor cycles, but real actionable advice may be given to the developers in clear text and an easy human readable form.

In the following, additional embodiments of the inventive concept—applicable for the method as well as for the system—will be described.

According to an advantageous embodiment of the method, the outputted conspicuous source code lines may be ordered by frequency of appearance in the running threads at the time of the crash. This may give the developer and crash analyzer a direct overview between running threads at the time of the crash and problematic source code lines. It may direct the root cause analysis in a promising direction.

According to a further advantageous embodiment of the method, the identifying unique source code lines may further comprise selecting—in particular before the determination each of the unique source code lines as a conspicuous source code line—a subset of threads having a high likelihood of being sufficient for root cause analysis of a given crash. This may include, e.g., filtering out those threads which had a wait status for a programmed time-dependent delay or a timed wait. A characteristic of such threads is the fact that they are woken up again after a pre-determined time. Hence, it may be pretty unlikely that those threads do contribute conspicuous source code lines.

According to a useful embodiment of the method, the predefined abstraction level may be indicative of how fine-grained the determination for conspicuous source code lines is. The abstraction level may be managed in, e.g., three different levels, like, low, medium or high. Experience shows that good results for root cause analysis may be achieved with this level of abstraction of the three categories. However, other granularity levels of the abstraction level are possible (e.g., 4 or 5 or 6 or even 10 levels).

According to a preferred embodiment, the method may also comprise determining whether the assessment value—which shall be output, i.e., made visible to a user—of the value of the abstraction ratio is within a predefined range. Having the abstraction ratio value in a specific value range, may increase the probability for a successful and short-time root cause analysis significantly. Hence, if the abstraction ratio value does not lie within the range, the method may be repeated with another abstraction level.

According to a further developed embodiment, the method may also comprise persistently storing sets of data relating to a successful or unsuccessful root cause analysis, namely: (i) a root cause hit value indicative of whether a root cause analysis was successful based on the execution of the method, and—typically always—(ii) the related abstraction ratio value, and/or (iii) a related bucket index depending on a bucket size value of a complete range of possible values of the abstraction value. For this, buckets (representing range values) may be built for the abstraction ratio value into which a specific abstract ratio value may be grouped. As an example, if the abstraction ratio value may range from 0 to 100% and 10 buckets may be specified, the abstraction ratio value of 35% may be sorted into the fourth bucket. Thereby it is assumed that the first bucket represents the range from 0 to 10%, the second bucket represents the range from 11 to 20%, the third bucket represents the range from 21 to 30%, and the fourth bucket represents the range from 31 to 40%, and so on. If a 20-bucket-schema would be used for the same example, the 35% abstraction ratio value would be sorted into the seventh bucket ranging from 31 to 35%.

According to a permissive embodiment, the method may also comprise determining a lower threshold value and/or an upper threshold value of the abstraction ratio. Thereby, the lower threshold value and the upper threshold value may define a range or value range relating to an abstraction ratio representing a high probability for a successful root cause analysis. For this determination, the above-mentioned bucketing and statistical methods applied to historic core dump analysis and successful and unsuccessful root cause analysis may be used—e.g., based on the Bayes Theorem.

According to a useful embodiment, the method may further comprise deselecting a core dump file from a group comprising at least two core dump files not fitting to the other core dump file(s) of the group. It may turn out that a core dump file relates to another core dump analysis problem—e.g., originating from a different application—so that the core dump files in question do not have a common source event. Hence, for the proposed method only core dump files relating to the same kind of software program problem may be used as input for the proposed concept.

According to a further elegant and useful embodiment, the method may also comprise converting the at least one core dump file into readable characters—in particular, into a human readable form. For this, existing tools may be used easily. One example may be the GNU debugger gdb.

According to one additionally advantageous embodiment, the method may be agnostic in respect to the hardware architecture the software program was executed before the at least one core dump file was created. Hence, especially if compared to state-of-the-art technologies for core dump analysis, the concept proposed here does not rely on a pre-trained system, in particular not one for a specific software stack.

According to an advance embodiment, the method may also comprise building as core dump files possible combinations—in particular all possible combinations—of the received at least one core dump file, executing the steps of (i) identifying unique source code lines, (ii) determining each of said unique source code lines as a conspicuous source code line, (iii) determining an abstraction ratio, and (iv) evaluating whether the predefined abstraction level value has to be adjusted for a further iteration, and selecting those conspicuous source code lines to be output relating to the highest abstraction ratio. Therefore, the analyzer/developer may be presented the conspicuous source code having the highest probability of helping to resolve the program issue, i.e., find the root cause of a crashed software program. If this is not possible, the next best result relating to the next lower Abstraction Ratio (AR) may be displayed to the analyzer/developer who may in turn try to resolve the issue at hand, and so on, until the root cause has been identified and fixed.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, to which the invention is not limited.

Preferred embodiments of the invention will be described, by way of example only, and with reference to the following drawings.

DETAILED DESCRIPTION

In the context of this description, the following conventions, terms and/or expressions may be used:

The term 'root cause analysis' (RCA) may denote the known systematic process for identifying a core reason for a problem or an event and an approach for responding to them. RCA is based on the basic assumption that search for errors may require more than merely "putting out fires" for problems that develop, but finding a way to prevent them. This may be more than applicable to finding fundamental reasons for software program crashes.

The term 'software crash' may denote the event at which a computer program, such as an enterprise application, may stop working properly and terminate, i.e., stops its execution.

The term 'core dump analysis' may denote the process of diagnosing the information that may be generated after a software crash, e.g., in the form of a core dump file. This may be a binary file that contains information about addresses or system statuses at which the software program stopped its proper execution.

The term 'core dump file' may denote the just mentioned binary file comprising the information of the system, memory and other variables at the time of the system or software crash. After a conversion using gdb (gnu debugger), the binary core dump file may be transformed into a human readable core dump form. When talking about source code lines—e.g., unique source code lines or analyzed source code lines in the core dump file—the converted version in a readable form is meant.

The term 'software program' may denote a computer program that has been written in a computer programming language and that may have been converted into a machine-readable form to be executed.

The term 'thread' may denote or relate to the smallest sequence of program instructions that may be managed independently by a scheduler, which may typically be a part of the operating system. Modern enterprise applications may very often be executed by a plurality of different but also identical threads in order to increase the performance for a plurality of users on multiprocessor computer systems.

The term 'unique source code line' may denote a line of a computer program (i.e., the source code) which may occur frequently in the computer program, but which will only be listed once, so that the source code line becomes a unique source code line across all thread and across all core dump files.

The term 'conspicuous source code line' may denote one or more of the unique source code lines which may appear in a plurality of different threads that have been executed at the time of the software crash (or just before). Whether a unique source code line may be labeled as a conspicuous source code line may be depend on the level of abstraction, i.e., abstraction level. As a general rule, the higher the abstraction level is, the more parallel executing threads should comprise the same unique source code line.

The term 'abstraction level' may relate to the number of parallel executing threads being executed at the time of the software crash, wherein the same unique source code line is present.

The term 'abstraction ratio' may denote a function using the unique source code lines identified and the related conspicuous source code lines. One example is expressed by formula (1) as described below. The abstraction ratio may be suitable for judging the quality of the analysis result because based on the unique source code lines it may be more challenging for the algorithm to come up with a recommendation (i.e., a conspicuous source code line responsible for the software crash).

In order to come up with a high ratio, the algorithm is challenged to return only a small number of conspicuous source code lines. Furthermore, the formula given below (compare formula (1)) compared with a pure human root cause analysis of a real enterprise software defect is a very good measure for identifying errors fast. Based on that, best practice ranges for the abstraction ratio were derived. Furthermore, experimentally, it could also be proven that a simplification ratio rs (e.g., rs=[1−(unique source code lines)/(analyzed source code lines)]) is a much worse variable to prove the quality of a root cause analysis support system.

The term 'assessment value' may denote an indicator, whether the resulting abstraction ratio may lie in a recommended range of a lower abstraction ratio threshold value and a higher abstraction ratio threshold value.

The term 'bucket index' may denote the index of a bucket a certain value may be related to. If a measurement range may be separated into, e.g., 10 buckets, the bucket index may range from 1 to 10 (or 0 to 9). Hence, if a percentage value of 58% may have been determined, it may be related to the sixth bucket; hence, the bucket index is 6.

Before turning to a description of the figures, a more general description of the inventive concept in multiple steps shall be given.

Step 1—Formatting core dump files: The set of available core dump files are automatically pre-processed to make them human-readable; they are converted from a binary format to a text format.

Step 2—Selecting a minimal set of relevant core dump files: The set of formatted core dump files may be analyzed to determine a subset with high confidence of being sufficient to do further root cause analysis of the problem at hand. The result of this step may be a list of core dump subsets ordered by confidence. The head of this list may be the first core dump subset, i.e., the subset with the highest confidence.

Step 3—Analyzing core dumps and produce assessment report: The head of the list of ordered core dump subsets determined in step 2 may be analyzed. This may result in a first assessment of (i) source code lines, and (ii) threads that both have a high probability to contribute to the issue.

Compared to the initial diagnostic data the assessment result may dramatically reduce the amount of information that an analyzer/software developer has to work through to identify the root cause, finally.

Step 4—Developer Feedback: In case the software developer has been able to thoroughly analyze the issue at hand using the set of core dump files provided in step 3, the procedure may terminate here. Otherwise, the head of the core dump subset may move forward by one and the procedure reiterates at step 3. In either case, the feedback result may be stored, the core dump subset and the confidence value in a persistent data store to be able to feedback this into step 2 to improve the subset selection.

Next and based on the four-step approach, a closer and more exemplary look shall be made at the 4 steps and a further $5^{th}$ step:

Step 1

On Unix-like operating systems core dumps can be processed by the gnu debugger (gdb) to convert the binary dump into a human-readable file. For example, the following command can generate a human-readable output comprising information of all threads including their current call stacks for a certain executable:

gdb executable—core core.file—batch—quiet\
−ex "thread apply all bt full" −ex "quit" >core.file.resolved

Step 2

The method may iterate over all elements of the core dump powerset using C as the current subset, ignoring the empty set. Hence, filtering out all threads that can be ignored, e.g., threads that do a timed wait since those threads wait for a timer to wake them up.

For the remaining threads, N abstraction ratios AR for the current subset C are determined. Using For N=3 the following categories are determined:

Cat_1: All source code lines that occur at least in ONE running thread in all core dumps.—This represents the set of conspicuous source code lines SLCat_1.

Cat_2: All source code lines that occur at least in TWO running thread in all core dumps.—This represents the set of conspicuous source code lines SLCat_2.

Cat_3: All source code lines that occur at least in THREE running thread in all core dumps.—This represents the set of conspicuous source code lines SLCat_3.

The abstraction ratios may then be calculated as follows:
AR_1=1— SLCat_1/slu,
AR_2=1— SLCat_2/slu,
AR_3=1—SLCat_3/slu, where slu=number of unique source code lines.

For the subset C $SLCat_n$ and the highest $AR_n$ in the range of, e.g., 45% ($AR_{low}$ lower bound), and, e.g., 90% ($AR_{up}$ upper bound) may be stored in a list L. Thereby, L may be a list of triples consisting of (C, $SLCat_n$, $AR_n$) sorted by abstraction ratio.

Step 3

Next, the set $SLCat_n$ for the head of the list L created in step 2 may be displayed. Based on $SLCat_n$, a thread-based view on the problem can be presented. For example, for each core dump and each thread the number or statement text of suspicious source code lines can be displayed. Then, a root cause analysis may continue with the information provided.

Step 4

Finally, Root Cause Hit RCH (Boolean, problem solved/ not solved), the used AR, are stored in a persistent data store. The variables used by the persistence data store could be as follows:
RCH=Root Cause Hit, a Boolean value,
AR=Abstraction Ratio, in percent,
AR10B=Abstraction Ratio Bucket, whereas the bucket range varies from 0 to 9 for a granularity of 10%, and
AR5B=Abstraction Ratio Bucket, whereas the bucket range varies from 0 to 19 for a granularity 5%.

An example of such a table is shown here:

| RCH | AR | AR10B | AR5B |
|---|---|---|---|
| 0 | 91 | 9 | 18 |
| 1 | 75 | 7 | 15 |
| 1 | 84 | 8 | 16 |
| 0 | 48 | 4 | 9 |
| 0 | 42 | 4 | 8 |

In case the problem is not solved (RCH=0; no root cause identified), step 3 is re-iterated, using the next triple stored in L.

Step 5

Once enough user feedback has been collected, a new $AR_{low}$ is determined using the data of successful problem solution to adapt the AR low in step 2. This can, e.g., be done using Bayes Theorem:

$P(A|B)=[P(A)*P(B|A)]/P(B)$, wherein $P(A|B)$ defines the probability P for the event A under the condition B.

Hence, A=>(RCH==1), i.e., event A represents a root cause hit and $B_i$=>(AR5B==i), i.e., event $B_i$ represents a usage of $AR5B_i$.

For example, using an Abstraction Ratio Bucket granularity of 5% the probability $(A|B_i)$ can be calculated as follows:

$P(A)$=[number of RCH]/(number of analysis), $P(B_i)$=[number of $AR5B_i$ used for analysis]/(number of analysis), $P(B_i|A)$=[number of successful analysis using $AR5B_i$]/(number of successful analysis), $P(A|B_i)=P(A)*P(Bi|A)/P(B_i)$.

Hence, MAX (($A|B_i$)) is used in step 2 to adapt $AR_{low}$.

In the following, a detailed description of the figures will be given. All instructions in the figures are schematic. Firstly, a block diagram of an embodiment of the inventive computer-implemented method for facilitating root cause analysis of a software crash by core dump analysis is given. Afterwards, further embodiments, as well as embodiments of the core dump analysis system for facilitating root cause analysis of a software crash by core dump analysis will be described.

Figure 1:
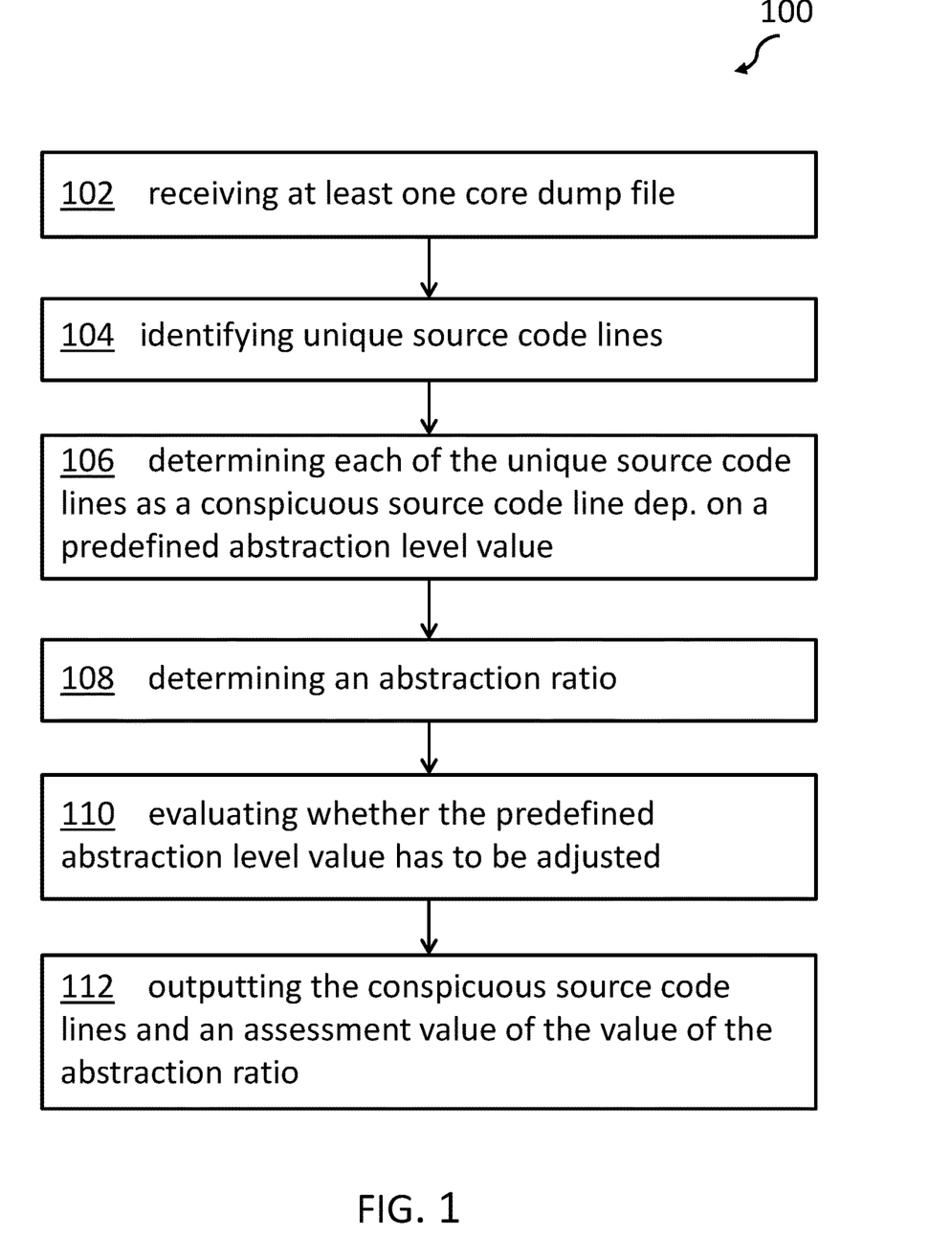
FIG. 1 shows a block diagram of an embodiment of the inventive computer-implemented method for facilitating root cause analysis of a software crash by core dump analysis.

FIG. 1 shows a block diagram of a preferred embodiment of the computer-implemented method 100 for facilitating root cause analysis of a software crash by core dump analysis. As derivable from the above, root cause analysis relates mainly to debugging support, i.e. finding errors in software programs, in particular after a crash. The method comprises receiving, 102, at least one core dump file relating to a software program being executable as a plurality of threads. It is understood that typically more than one core dump files are available which originate normally the same type of application. Otherwise, only strange results can be expected.

The method 100 comprises also identifying, 104, unique source code lines in the at least one core dump file for each running thread at the time of the software crash, determining, 106, each of the unique source code lines as a conspicuous source code line depending on a predefined abstraction level value. The abstraction level value can be received—e.g., from a user—at the start of the process. The abstraction level value thereby indicates a number of occurrences of the conspicuous source code line in different threads.

At this point, the following can be an intermediate result:
number of source code lines analyzed (sla): 481 (i.e., all lines found in all core dumps).
number of source code lines unique (slu): 76 (i.e., duplicates are removed from sla)
number of source code lines conspicuous: 17 (i.e., those source code lines of slu which the algorithm rates to be conspicuous.

Furthermore, the method 100 comprises determining, 108, an abstraction ratio—AR—as a function of a number of conspicuous source code lines and a number of unique source code lines $slu_i$, e.g., in the form of $AR=1-slc/slu$, wherein  (1)

slc=number of conspicuous source code lines, and
slu=number of unique source code lines
for a given thread.

Furthermore, the method 100 comprises evaluating, 110, whether the predefined abstraction level value—i.e., the input parameter—has to be adjusted for a further iteration of the steps determining unique source code line as a conspicuous source code line and determining an abstraction ratio. This may, e.g., be based on a received root cause hit (RCH) value, i.e., whether the root cause of the software crash has been found by a human analyzer, or because the AR value was too bad.

In a further step, the method 100 comprises outputting, 112, the conspicuous source code lines and an assessment value for the value of the abstraction ratio, in particular, in the form of a percentage value.

As a further option to the described method 100 it is also possible to evaluate proactively whether an adaption of $AR_{low}$ based on collected data (RCH values, AR values, bucket-index values, etc.) should be performed. Hence evaluating would then be interpretable in the form whether AR may lie in the best-practice range or whether it is first checked (i.e., determined) whether enough data are available in order to determine $AR_{low}$ via the Bayes Theorem, perform the adaptation and, as a next step, execute the test of the value range.

Figure 2:
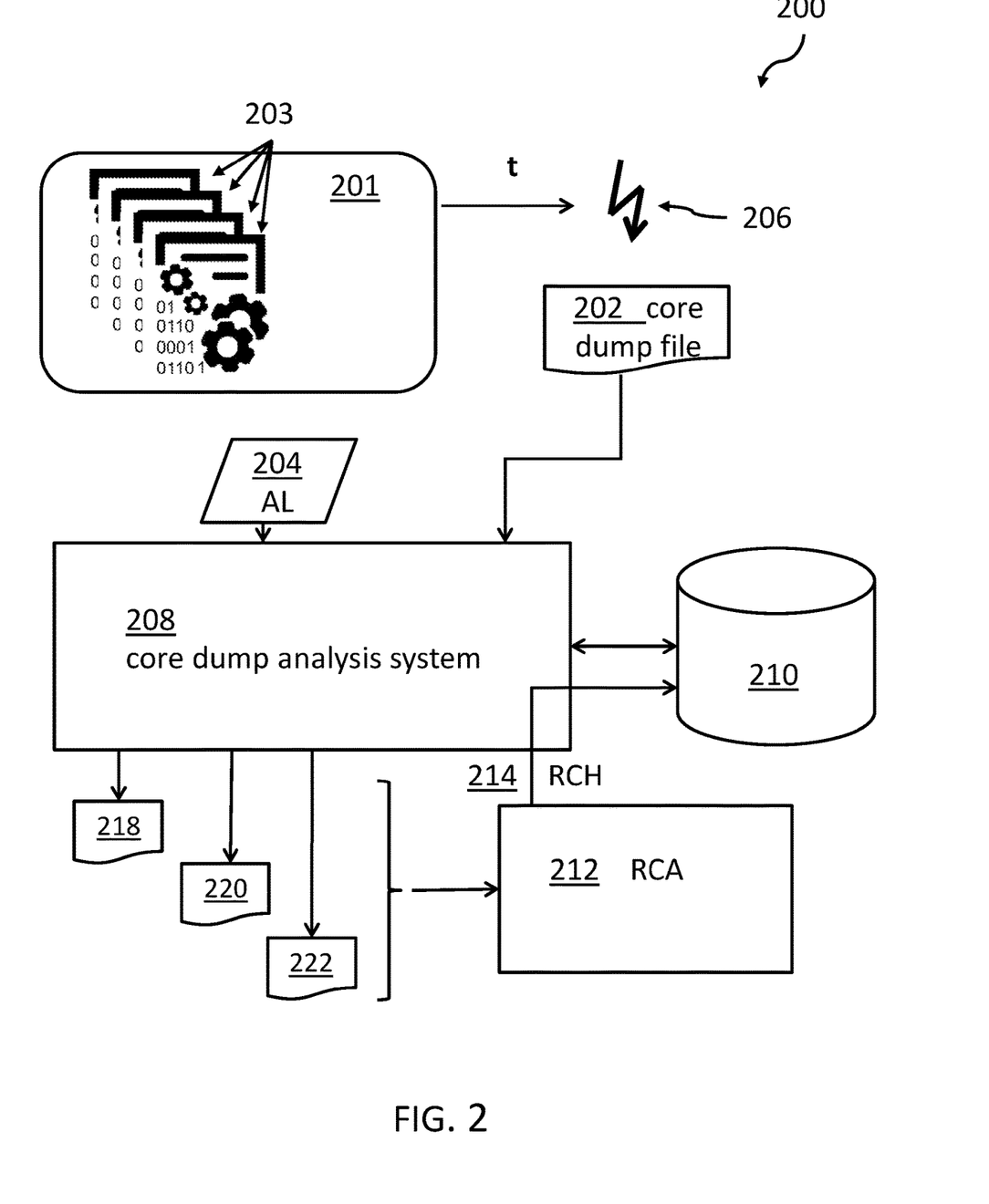
FIG. 2 shows a block diagram of an embodiment integrated into a core dump analysis workflow.

FIG. 2 shows a block diagram of an embodiment 200 integrated into a core dump analysis workflow. The block 201 shall represent an executed software program which may have a plurality of parallel threads 203, of which many may be identical. E.g., in a database system or an enterprise application—these are usually multi-user systems where a larger community of users performs the same or similar tasks—pretty often identical threads run or are executed in parallel in order to increase the overall performance of the application.

It may occur that after a time "t"—initiated due to an error in the program code—the execution of the program code comes to a halt or has stopped altogether, i.e., it crashes, 206. Thereby, a core dump file 202 is generated. Typically, system-level routines are responsible for this.

The at least one core dump file 202 is fed to a version of the proposed core dump analysis system 208. Additionally, an abstraction level 204 (not to be confused with the abstraction ratio) may also be input to the core dump analysis system 208. Based on the method 100 discussed above, the core dump analysis system 208 outputs—in particular to a user in a readable format—conspicuous source code lines 218, a value for the abstraction ratio 220 together with a related range 222 for the abstraction ratio 220. This information, especially the conspicuous source code lines, can be used by a source code analyzer/programmer to perform his root cause analysis 212. Whether it is successful or not can then be permanently stored in a data storage 210 in the form of a root cause hit value 214 (RCH) together with either data from the executed proposed method, namely the conspicuous source code lines 218, the used abstraction level 204, the determined abstraction ratio 220, and the range 222.

Figure 3:
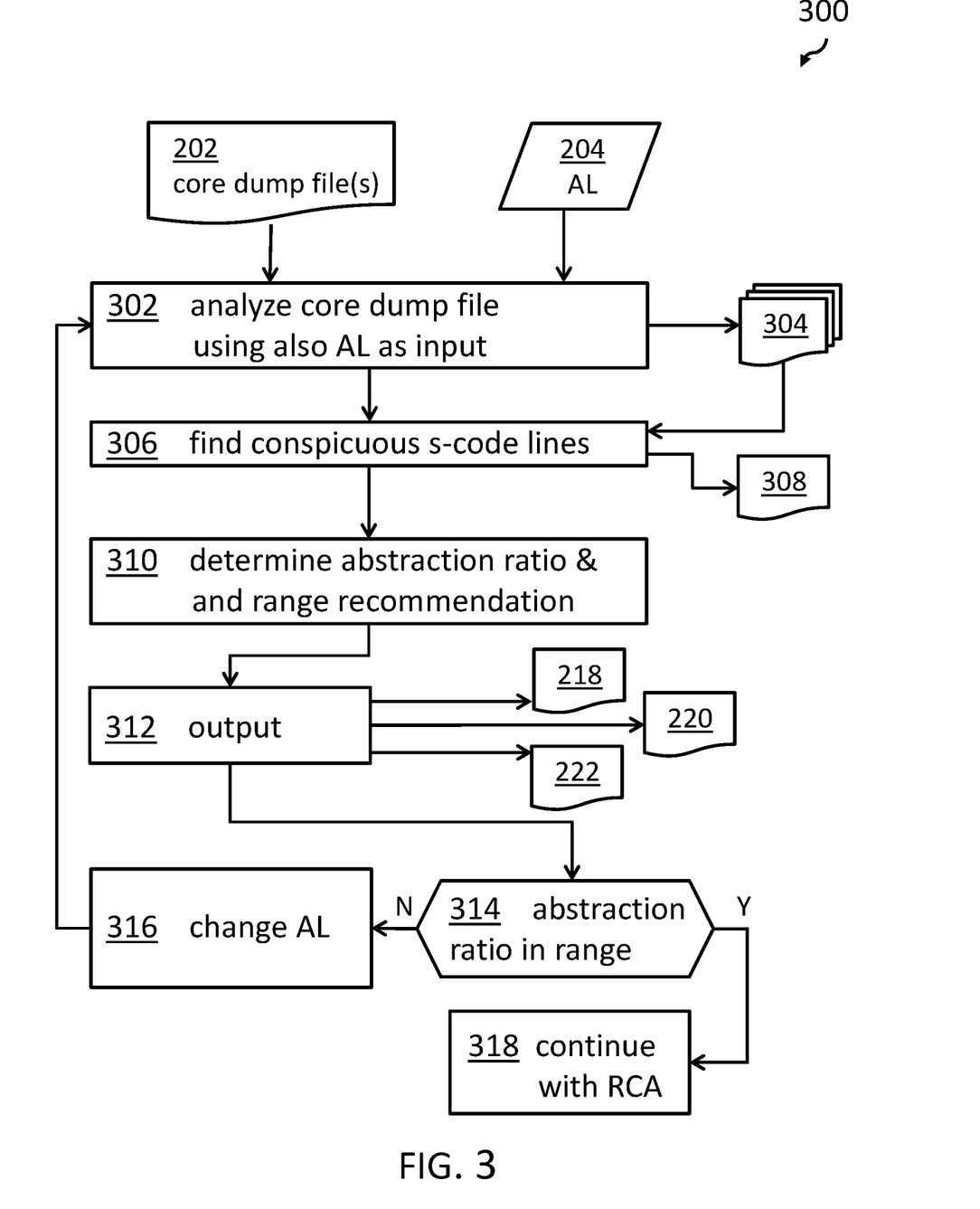
FIG. 3 shows a block diagram of an embodiment of a proposed concept in a more detailed and more implementation-near form.

FIG. 3 shows a block diagram of an embodiment 300 of a proposed concept in a more detailed and more implementation-near form. After the core dump file 202 and the abstraction level AL 204 (compare also FIG. 2) have been received, the process starts with analyzing, 302, the core dump file, resulting in a plurality of unique source code lines 304 per thread. Using this as input for the next step, the process continues with finding, 306, conspicuous source code lines 308. This is performed depending on the abstraction level AL 204, namely, whether a conspicuous source code lines 308 may be found in one, two, three, or more of the parallel running threads.

In a next step, an abstraction ratio according to the formula (1) and a range recommendation is determined, 310. In case of a single received core dump, outputs 312 are generated in the form of the conspicuous source code lines 218, the abstraction ratio 220, and the related range 222.

Then, it is determined, 314 whether the abstraction ratio is in the range. If that is not the case—case "N"—the process continues with changing, 316, the abstraction level and returning back to step 302 of analyzing the core dump.

If, on the other side, the abstraction ratio value is determined, 314, to be in the range, the process continues 318 with a regular root cause analysis.

Figure 4:
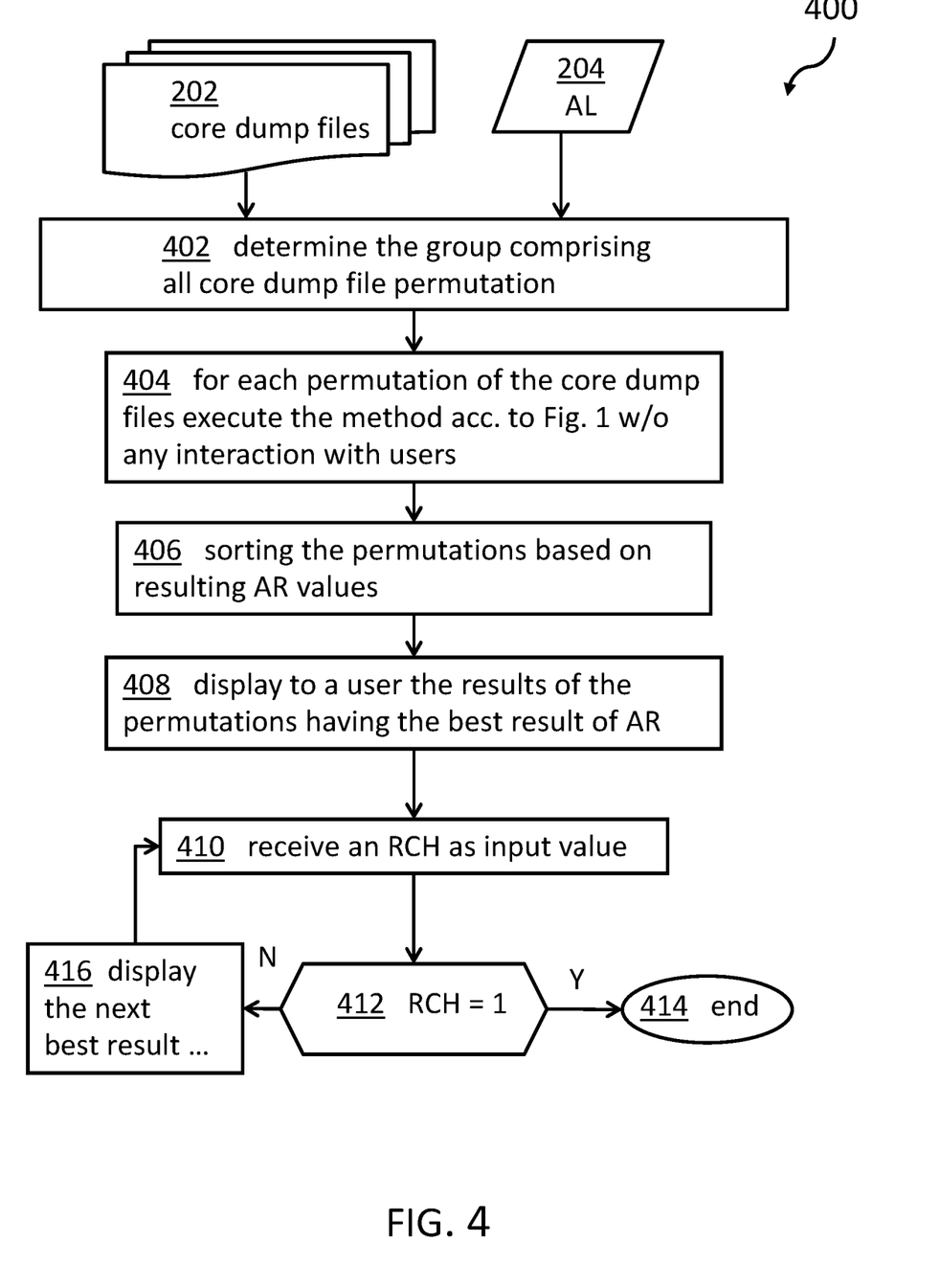
FIG. 4 shows a block diagram of an extended embodiment taking into account a plurality of core dumps.

FIG. 4 shows a block diagram of an extended embodiment 400 taking into account a plurality of core dump files. The process starts with the plurality of core dump files 202 and the abstraction level 204. Firstly, a group comprising all core dump file permutation is determined, 402. Then, for each permutation of the core dump files 202 the method according to FIG. 1, without any interaction with users is performed, 404. The permutations are sorted, 406, based on resulting AR values and the results having the best AR of the permutations is displayed (or otherwise output), 408, to a user, e.g., an analyzer/programmer He may perform his root cause analysis and input (410, receive) a root cause hit RCH ("1") or miss ("0").

If the RCH value is 1 at determination 412—which equals a successful root cause analysis—the process ends, 414. Otherwise, the next best result of the permutation is displayed, 416, and the procedure repeated.

Figure 5:
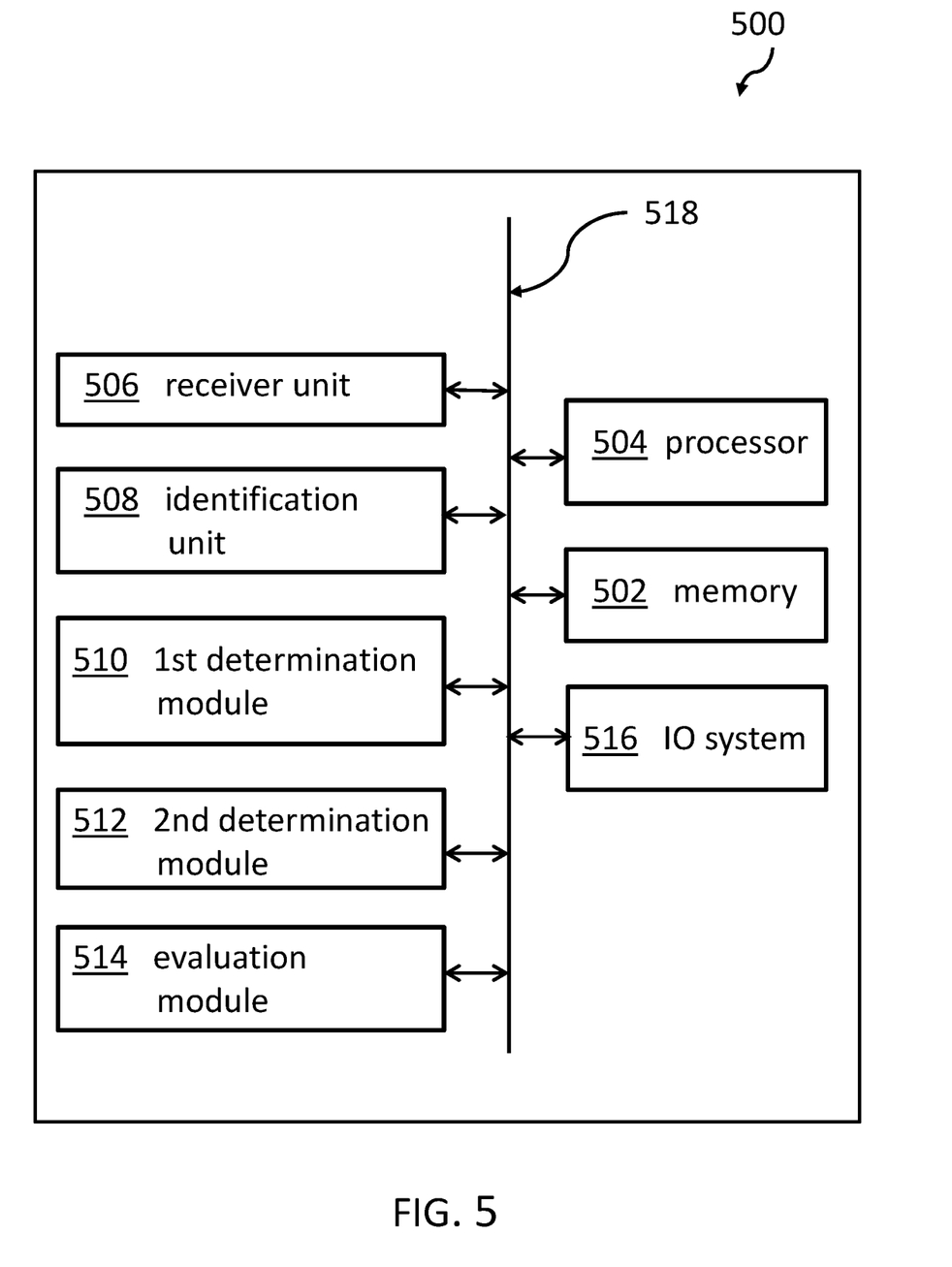
FIG. 5 shows a block diagram of an embodiment of the inventive core dump analysis system for facilitating root cause analysis of a software crash by core dump analysis.

Last but not least, FIG. 5 shows a block diagram of an embodiment of the inventive core dump analysis system 500 for facilitating root cause analysis of a software crash by core dump analysis. The system 500 contains a memory 502 communicatively coupled to a processor 504, the memory storing program code portion which, when executed by the processor enable the processor to receive—in particular by a receiver unit 506—at least one core dump file relating to a software program being executable as a plurality of threads, identify—in particular, by an identification unit 508—unique source code lines in the at least one core dump file for each running thread at the time of the software crash, and determine—in particular by a $1^{st}$ determination unit—each of the unique source code lines as a conspicuous source code line depending on a predefined abstraction level value. The value of the abstraction level shows a number of occurrences of the conspicuous source code line in different threads.

Additionally, program code portions of the source code analysis system 500 enable the processor to determine—in particular by a $2^{nd}$ determination unit—an abstraction ratio as a function of a number of conspicuous source code lines and a number of unique source code lines, to evaluate—in particular by an evaluation module 514—whether the predefined abstraction level value has to be adjusted for a further iteration of the steps determining unique source code line as a conspicuous source code line and determining an abstraction ratio, and to output—in particular by a computer I/O system 516—the conspicuous source code lines and an assessment value for the value of the abstraction ratio.

It shall also be mentioned that all functional units, modules and functional blocks—namely, the process of 504, the memory 502, the receiver unit 506, the identification unit 508, the first determination unit 510, the second determination unit 512, the evaluation module 514 and the I/O system 516—may be communicatively coupled to each other for signal or message exchange in a selected 1:1 manner Alternatively, the functional units, modules and functional blocks can be linked to the system internal bus system 518 maybe for a selective signal or message exchange.

Figure 6:
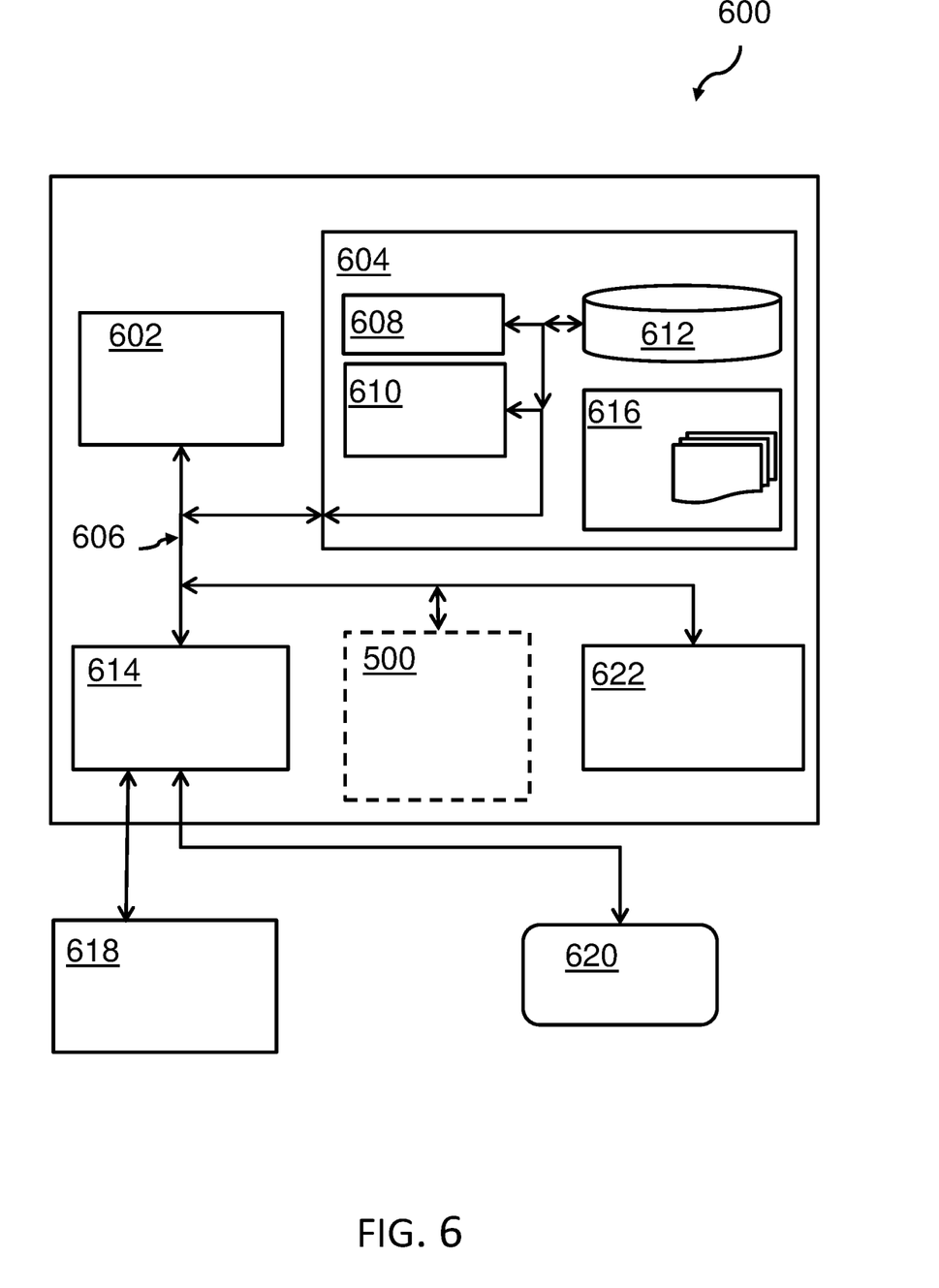
FIG. 6 shows an embodiment of a computing system comprising the system according to FIG. 5.

Embodiments of the invention may be implemented together with virtually any type of computer, regardless of the platform being suitable for storing and/or executing program code. FIG. 6 shows, as an example, a computing system 600 suitable for executing program code related to the proposed method.

The computing system 600 is only one example of a suitable computer system and is not intended to suggest any limitation as to the scope of use or functionality of embodiments of the invention described herein, regardless, whether the computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random-access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limiting, as well as an operating system, one or more application programs, other program modules, and program data. Each of the operating systems, one or more application programs, other program modules, and program data or some combination thereof, may include an implementation of a networking environment. Program modules 616 generally carry out the functions and/or methodologies of embodiments of the invention, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of the computer system/server 600 via bus 606. It should be understood that, although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the core dump analysis system 500 for facilitating root cause analysis of a software crash by core dump analysis may be attached to the bus system 606.

The descriptions of the various embodiments of the present invention have been presented for purposes of illustration but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semiconductor system for a propagation medium. Examples of a computer-readable medium may include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD R/W), DVD and Blu-ray Disc.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction set architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms a, an and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

In a nutshell, the inventive concept may be summarized by the following clauses:

1. A computer-implemented method for facilitating root cause analysis of a software crash by core dump analysis, the method comprising receiving at least one core dump file relating to a software program being executable as a plurality of threads, identifying unique source code lines in the at least one core dump file for each running thread at a time of the software crash, determining each of the unique source code lines as a conspicuous source code line depending on a predefined abstraction level value, the abstraction level value being indicating of a number of occurrences of the conspicuous source code lines in different threads, determining a value of an abstraction ratio as a function of a number of conspicuous source code lines and a number of the unique source code lines, evaluating whether the predefined abstraction level value has to be adjusted for a further iteration of the steps determining the unique source code lines as the conspicuous source code lines and determining the value of the abstraction ratio, outputting the conspicuous source code lines and an assessment value for the value of the abstraction ratio.

2. The method according to clause 1, wherein the conspicuous source code lines that are output are ordered by frequency of appearance in running threads at the time of the crash.

3. The method according to clause 1 or 2, wherein identifying the unique source code lines further comprises selecting a subset of threads having a high likelihood of being sufficient for root cause analysis of a given crash.

4. The method according to any of the preceding clauses, wherein the predefined abstraction level is indicative of how fine-grained the determination for the conspicuous source code lines is.

5. The method according to any of the preceding clauses, also comprising determining whether the assessment value of the value of the abstraction ratio is within a predefined range.

6. The method according to any of the preceding clauses, also comprising persistently storing a root cause hit value indicative of whether a root cause analysis was successfully based on an execution of the method, and a related value of the abstraction ratio, and/or a related bucket index depending on a bucket size value of a complete range of possible values of the value of the abstraction ratio.

7. The method according to clause 6, also comprising determining a lower threshold value and/or an upper threshold value of the abstraction ratio, wherein the lower threshold value and the upper threshold value define a range relating to the value of the abstraction ratio representing a high probability for a successful root cause analysis.

8. The method according to any of the preceding clauses, also comprising deselecting a core dump file from a group comprising at least two core dump files not fitting to other core dump files of the group.

9. The method according to any of the preceding clauses, also comprising wherein the receiving the at least one core dump file also comprises converting the at least one core dump file into human readable characters.

10. The method according to any of the preceding clauses, wherein the method is agnostic in respect to a hardware architecture the software program was executed on before the at least one core dump file was created.

11. The method according to any of the preceding clauses, also comprising building as core dump files possible combinations of the received at least one core dump file, executing the steps of (i) identifying the unique source code lines, (ii) determining each of the unique source code lines as the conspicuous source code line; (iii) determining the abstraction ratio, and (iv) evaluating whether the predefined abstraction level value has to be adjusted for the further iteration, and selecting those conspicuous source code lines to be output relating to a highest abstraction ratio.

12. A core dump analysis system for facilitating root cause analysis of a software crash by core dump analysis, the system comprising a memory communicatively coupled to a processor, the memory storing program code portion which, when executed by the processor enable the processor to receive at least one core dump file relating to a software program being executable as a plurality of threads, identify unique source code lines in the at least one core dump file for each running thread at a time of the software crash, determine each of the unique source code lines as a conspicuous source code line depending on a predefined abstraction level value, the abstraction level value indicating of a number of occurrences of the conspicuous source code line in different threads, determine a value of an abstraction ratio as a function of a number of conspicuous source code lines and a number of the unique source code lines, evaluate whether the predefined abstraction level value has to be adjusted for a further iteration of the steps determining unique source code line as the conspicuous source code line and determining the value of the abstraction ratio, and output the conspicuous source code lines and an assessment value for the value of the abstraction ratio.

13. The system according to clause 12, wherein the conspicuous source code lines that are output are ordered by frequency of appearance in running threads at the time of the crash.

14. The system according to clause 12 or 13, wherein the program code portion enable the processor during identifying unique source code lines also to select a subset of threads having a high likelihood of being sufficient for root cause analysis of a given crash.

15. The system according to any of the clauses 12 to 14, wherein the predefined abstraction level is indicative of how fine-grained the determination for the conspicuous source code lines is.

16. The system according to any of the clauses 12 to 15, wherein the program code portion enable the processor further to determine whether the assessment value of the value of the abstraction ratio is within a predefined range.

17. The system according to any of the clauses 12 to 16, wherein the program code portion enable the processor further to store persistently at least one values selected out of a group
a root cause hit value indicative of whether a root cause analysis was successfully based on execution of a method,
a related abstraction ratio value, and
a related bucket index depending on a bucket size value of a complete range of possible values of the value of the abstraction ratio.

18. The system according to clause 17, wherein the program code portion enable the processor further to determine a lower threshold value and/or an upper threshold value of the abstraction ratio, wherein the lower threshold value and the upper threshold value define a range relating to the abstraction ratio representing a high probability for a successful root cause analysis.

19. The system according to any of the clauses 12 to 18, wherein the program code portion enable the processor further to deselecting a core dump file from a group comprising at least two core dump files not fitting to other core dump files of the group.

20. A computer program product for facilitating root cause analysis of a software crash by core dump analysis, wherein the hierarchy comprises a root node and at least one child node comprising related sub-trees, the computer program product comprising a computer readable storage medium having program instructions embodied therewith, the program instructions being executable by one or more computing systems or controllers to cause the one or more computing systems to receive at least one core dump file relating to a software program being executable as a plurality of threads,
identify unique source code lines in the at least one core dump file for each running thread at a time of the software crash,
determine each of the unique source code lines as a conspicuous source code line depending on a predefined abstraction level value, the abstraction level value being indicating of a number of occurrences of the conspicuous source code line in different threads,
determine an abstraction ratio as a function of a number of conspicuous source code lines and a number of unique source code lines,
evaluate whether the predefined abstraction level value has to be adjusted for a further iteration of the steps determining unique source code lines as the conspicuous source code lines and determining the abstraction ratio, and
output the conspicuous source code line and an assessment value for a value of an abstraction ratio.

What is claimed is:

1. A computer-implemented method for facilitating root cause analysis of a software crash by core dump analysis, the method comprising:
receiving at least one core dump file relating to a software program being executable as a plurality of threads,
identifying unique source code lines in the at least one core dump file for each running thread at a time of the software crash,
determining each of the unique source code lines as a conspicuous source code line depending on a predefined abstraction level value, the abstraction level value being indicating of a number of occurrences of the conspicuous source code lines in different threads,
determining a value of an abstraction ratio as a function of a number of conspicuous source code lines and a number of the unique source code lines,
evaluating whether the predefined abstraction level value has to be adjusted for a further iteration of the steps determining the unique source code lines as the conspicuous source code lines and determining the value of the abstraction ratio,
outputting the conspicuous source code lines and an assessment value for the value of the abstraction ratio.

2. The method according to claim 1, wherein the conspicuous source code lines that are output are ordered by frequency of appearance in running threads at the time of the crash.

3. The method according to claim 1, wherein identifying the unique source code lines further comprises:
selecting a subset of threads having a high likelihood of being sufficient for root cause analysis of a given crash.

4. The method according to claim 1, wherein the predefined abstraction level is indicative of how fine-grained the determination for the conspicuous source code lines is.

5. The method according to claim 1, also comprising:
determining whether the assessment value of the value of the abstraction ratio is within a predefined range.

6. The method according to claim 1, also comprising:
persistently storing:
a root cause hit value indicative of whether a root cause analysis was successfully based on an execution of the method, and
a related value of the abstraction ratio, and/or
a related bucket index depending on a bucket size value of a complete range of possible values of the value of the abstraction ratio.

7. The method according to claim 6, also comprising:
determining a lower threshold value and/or an upper threshold value of the abstraction ratio, wherein the lower threshold value and the upper threshold value define a range relating to the value of the abstraction ratio representing a high probability for a successful root cause analysis.

8. The method according to claim 1, also comprising:
deselecting a core dump file from a group comprising at least two core dump files not fitting to other core dump files of the group.

9. The method according to claim 1, wherein the receiving the at least one core dump file also comprises:
converting the at least one core dump file into human readable characters.

10. The method according to claim 1, wherein the method is agnostic in respect to a hardware architecture the software program was executed on before the at least one core dump file was created.

11. The method according to claim 1, also comprising:
building as core dump files possible combinations of the received at least one core dump file,
executing the steps of (i) identifying the unique source code lines, (ii) determining each of the unique source code lines as the conspicuous source code line; (iii) determining the abstraction ratio, and (iv) evaluating whether the predefined abstraction level value has to be adjusted for the further iteration, and
selecting those conspicuous source code lines to be output relating to a highest abstraction ratio.

12. A core dump analysis system for facilitating root cause analysis of a software crash by core dump analysis, the system comprising:
a memory communicatively coupled to a processor, the memory storing program code portion which, when executed by the processor enable the processor to:
receive at least one core dump file relating to a software program being executable as a plurality of threads,
identify unique source code lines in the at least one core dump file for each running thread at a time of the software crash,
determine each of the unique source code lines as a conspicuous source code line depending on a predefined abstraction level value, the abstraction level value indicating of a number of occurrences of the conspicuous source code line in different threads,
determine a value of an abstraction ratio as a function of a number of conspicuous source code lines and a number of the unique source code lines,
evaluate whether the predefined abstraction level value has to be adjusted for a further iteration of the steps determining unique source code line as the conspicuous source code line and determining the value of the abstraction ratio, and
output the conspicuous source code lines and an assessment value for the value of the abstraction ratio.

13. The system according to claim 12, wherein the conspicuous source code lines that are output are ordered by frequency of appearance in running threads at the time of the crash.

14. The system according to claim 12, wherein the program code portion enable the processor during identifying the unique source code lines also to:
select a subset of threads having a high likelihood of being sufficient for root cause analysis of a given crash.

15. The system according to claim 12, wherein the predefined abstraction level is indicative of how fine-grained the determination for the conspicuous source code lines is.

16. The system according to claim 12, wherein the program code portion enable the processor further to:
determine whether the assessment value of the value of the abstraction ratio is within a predefined range.

17. The system according to claim 12, wherein the program code portion enable the processor further to:
store persistently at least one values selected out of a group,
a root cause hit value indicative of whether a root cause analysis was successfully based on execution of a method,
a related abstraction ratio value, and
a related bucket index depending on a bucket size value of a complete range of possible values of the value of the abstraction ratio.

18. The system according to claim 17, wherein the program code portion enable the processor further to:
determine a lower threshold value and/or an upper threshold value of the abstraction ratio, wherein the lower threshold value and the upper threshold value define a range relating to the abstraction ratio representing a high probability for a successful root cause analysis.

19. The system according to claim 12, wherein the program code portion enable the processor further to:
deselecting a core dump file from a group comprising at least two core dump files not fitting to other core dump files of the group.

20. A non-transitory computer program product for facilitating root cause analysis of a software crash by core dump analysis, wherein a hierarchy comprises a root node and at least one child node comprising related sub-trees, the non-transitory computer program product comprising a non-transitory computer readable storage medium having program instructions embodied therewith, the program instructions being executable by one or more computing systems or controllers to cause the one or more computing systems to:
receive at least one core dump file relating to a software program being executable as a plurality of threads,
identify unique source code lines in the at least one core dump file for each running thread at a time of the software crash,
determine each of the unique source code lines as a conspicuous source code line depending on a predefined abstraction level value, the abstraction level value being indicating of a number of occurrences of the conspicuous source code line in different threads,
determine an abstraction ratio as a function of a number of conspicuous source code lines and a number of unique source code lines,
evaluate whether the predefined abstraction level value has to be adjusted for a further iteration of the steps determining unique source code lines as the conspicuous source code lines and determining the abstraction ratio, and
output the conspicuous source code line and an assessment value for a value of an abstraction ratio.

* * * * *